May 28, 1940.　　　L. W. EVANS　　　2,202,577
DENTAL IMPRESSION MOLD
Filed Jan. 11, 1939
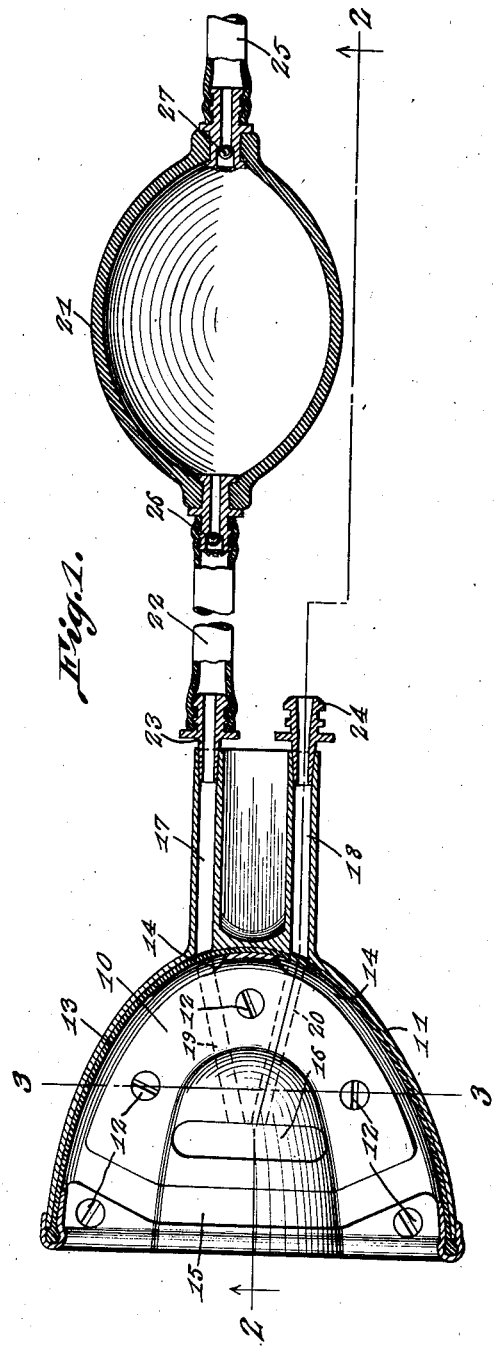
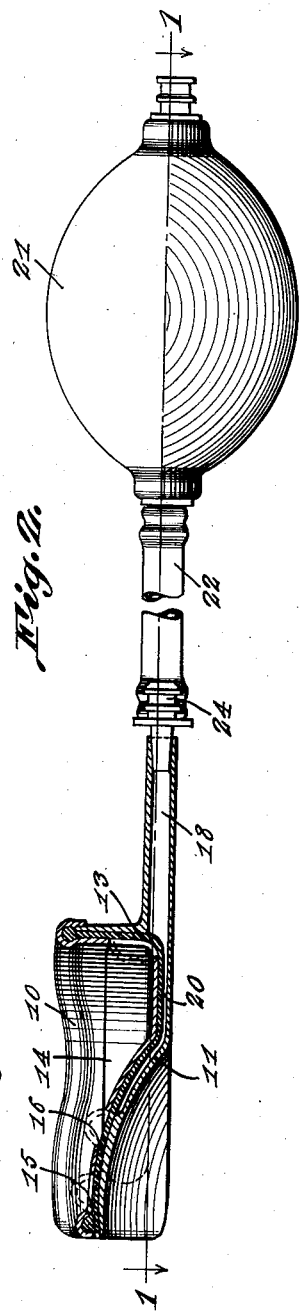
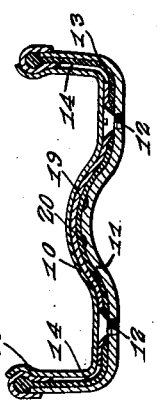
Louis W. Evans, INVENTOR
BY Victor J. Evans & Co.
ATTORNEYS Patented May 28, 1940

2,202,577

UNITED STATES PATENT OFFICE 2,202,577

DENTAL IMPRESSION MOLD

Louis W. Evans, Salineville, Ohio

Application January 11, 1939, Serial No. 250,449

1 Claim. (Cl. 32—17)

This invention relates to dental trays and has for an object to provide a metallic tray having rubber portions adapted to be expanded by pressure of hot water to soften the dental wax or other material after an initial impression is made, these rubber portions being thereafter inflated to exert pressure against the softened impression material so that the same will conform to every cavity in the mouth and around the gums.

Ordinarily after the initial impression is taken the tray is removed from the patient's mouth and surplus impression material trimmed from around the edges of the tray by the dentist's fingers. Then the tray is again inserted in the mouth and the finished impression is taken. This is not entirely satisfactory as is well known since the dentist must use his fingers in the patient's mouth, to press the impression material firmly into the cavities and around the gums so that a true facsimile of the shape of the mouth will be impressed in the impression material.

With the above disadvantages in mind the present invention provides sectional mold plates joined together to provide a tray, with a sheet of rubber between the sections, the upper tray having portions removed to expose the sheet of rubber. A pair of tubes disposed exteriorly of the tray communicate through ducts in the lower tray with the exposed portions of the sheet of rubber so that hot water may be pumped into the tray underneath the rubber sheet to heat the rubber and soften the impression material and thereafter the water may be withdrawn and air pumped through one of the tubes to inflate the rubber portions so that the latter will press the hot impression material compactly against the gums and against the cavities in the mouth without any use being made of the dentist's fingers.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a longitudinal sectional view of a dental tray constructed in accordance with the invention and taken on the line 1—1 of Figure 2.

Figure 2 is a longitudinal sectional view taken on the line 2—2 of Figure 1 with parts in elevation.

Figure 3 is a cross sectional view taken on the line 3—3 of Figure 1.

Referring now to the drawing in which like characters of reference designate similar parts in the various views, 10 and 11 designate respectively upper and lower metal mold plates joined together by screws 12 to provide a dental tray. A rubber sheet 13 is interposed between the sections 10 and 11 and the upper section 10 is cut away to provide arcuate exposed portions 14 of the rubber sheet around the inner periphery of the dental tray and also is cut away to provide transverse exposed portions 15 and 16 of the rubber sheet. A pair of tubes 17 and 18 are formed integral with the lower section 11 and communicates through ducts 19 and 20 with the transverse section 16. The tubes open against the rubber sheet 13 at the initial end of the arcuate exposed portions 14 which latter are integral at the rear end with the transverse exposed portion 15 of the rubber sheet.

A rubber bulb 21 is provided with a short length of hose 22 to be interchangeably connected with hose connections 23 and 24 carried by the tubes 17 and 18. The bulb is also provided with a short hose 25 which may be connected to any suitable source of water supply. The bulb is provided with check valves 26 and 27 to restrict flow to one direction.

In operation, for sanitary reasons a paper lining strip 28, shown only in Figure 3, is placed upon the upper section 10 and then the dental wax or impression material is applied to the tray and upon the lining in the conventional manner. The tray may now be inserted in the patient's mouth and the initial rough impression taken. The tray is then withdrawn and surplus wax or impression material removed from around the edges of the tray. The tray is again inserted in the patient's mouth to take the final impression and at this time hot water is pumped by means of the bulb 21 through the tube 17 and passes through the ducts 19 and 20 to the transverse exposed portion 16 of the rubber sheet and also passes underneath the rubber sheet through the arcuate exposed portions 15 and through the transverse exposed portions 16 of the sheet. The hot water bulges up all of the exposed portions of the rubber sheet just mentioned and the heat of the water is transmitted to the impression material thereby softening the material. The hot water may now be cut off and thereupon air may be pumped into the ducts and behind the exposed portions of the rubber sheet above traced to inflate the exposed portions of the rubber sheet and cause pressure against the softened heated impression material so that the latter flows into and shapes itself to all of the cavities of the mouth as well as the contour of the patient's gums. At the proper time the tray may be removed from the patient's mouth and the impression material treated in the customary manner.

From the above description it is thought that the construction and operation of the invention will be fully understood without further explanation.

What is claimed is:

A dentist's tray comprising upper and lower mold plate sections clamped together to provide a tray, a sheet of rubber between the sections, the upper section being cut away at predetermined points to expose the rubber sheet, a pair of tubes communicating with the exposed portions of the rubber sheet and adapted to selectively supply hot water or air pressure for deforming the exposed portions of the rubber sheet to shape the impression material accurately to the contour of the mouth and gums when an impression is being taken.

LOUIS W. EVANS.